United States Patent
Aalto

(10) Patent No.: US 12,140,795 B2
(45) Date of Patent: Nov. 12, 2024

(54) OPTICAL 2D SPOT-SIZE CONVERSION

(71) Applicant: Teknologian tutkimuskeskus VTT Oy, Espoo (FI)

(72) Inventor: Timo Aalto, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 198 days.

(21) Appl. No.: 17/786,553

(22) PCT Filed: Dec. 18, 2020

(86) PCT No.: PCT/FI2020/050856
§ 371 (c)(1),
(2) Date: Jun. 17, 2022

(87) PCT Pub. No.: WO2021/123505
PCT Pub. Date: Jun. 24, 2021

(65) Prior Publication Data
US 2023/0030105 A1    Feb. 2, 2023

(30) Foreign Application Priority Data

Dec. 18, 2019   (FI) ..................... 20196094

(51) Int. Cl.
*G02B 6/122*   (2006.01)
*G02B 6/12*    (2006.01)
(Continued)

(52) U.S. Cl.
CPC ........... *G02B 6/1228* (2013.01); *G02B 6/125* (2013.01); *G02B 6/126* (2013.01); *G02B 6/14* (2013.01); *G02B 2006/12152* (2013.01)

(58) Field of Classification Search
CPC ........ G02B 6/125; G02B 6/1228; G02B 6/14; G02B 6/305; G02B 2006/12104; G02B 2006/12152
See application file for complete search history.

(56) References Cited

U.S. PATENT DOCUMENTS 9,316,792 B2 *  4/2016  Park ................ G02B 6/305
2002/0039469 A1  4/2002  Jeong et al.
(Continued)

FOREIGN PATENT DOCUMENTS

CN   105158847 A   12/2015
JP   2015203781 A  11/2015
(Continued)

OTHER PUBLICATIONS

Noriki et al: 45-degree curved micro-mirror for vertical optical I/O of silicon photonics chip. Optics Express, Jul. 2019, vol. 27, pp. 19749-19757.

*Primary Examiner* — Omar R Rojas
(74) *Attorney, Agent, or Firm* — Laine IP Oy

(57) ABSTRACT

An optical assembly for realizing horizontal and vertical spot-size conversion to couple light from a thin waveguide to a thick waveguide is disclosed. The assembly comprises at least one first thin waveguide with a first section having a first optical mode field and a horizontal spot-size expansion section providing spot-size conversion for a first horizontal dimension of said first optical mode field of a light beam propagating in said first waveguide, and at least one second thick waveguide with a second section having a second optical mode field and a horizontal spot-size reduction section providing spot-size conversion for a second horizontal dimension of said second optical mode field of a light beam propagating in said second waveguide. The expanded end of said first waveguide is aligned and rotated to interface with the reduced end of said second waveguide, so that the mode fields in said first and second waveguides are rotated 90 degrees with respect to each other, whereby the spot size of a light beam so coupled between the first and second waveguides is expanded or shrunk in both transverse dimensions, depending on the direction of the light beam.

20 Claims, 3 Drawing Sheets

(51) Int. Cl.
  *G02B 6/125* (2006.01)
  *G02B 6/126* (2006.01)
  *G02B 6/14* (2006.01)

(56) References Cited

U.S. PATENT DOCUMENTS

| | | |
|---|---|---|
| 2005/0036526 A1 | 2/2005 | Doerr et al. |
| 2006/0088246 A1 | 4/2006 | Han et al. |
| 2009/0010590 A1 | 1/2009 | Krishnamoorthy et al. |
| 2010/0142900 A1 | 6/2010 | Uchida et al. |
| 2015/0286002 A1 | 10/2015 | Frumkin et al. |
| 2019/0146153 A1 | 5/2019 | Park et al. |
| 2019/0258175 A1 | 8/2019 | Dietrich et al. |

FOREIGN PATENT DOCUMENTS

| | | |
|---|---|---|
| JP | 20017187709 A | 10/2017 |
| WO | WO2019235183 A1 | 12/2019 |

\* cited by examiner

OPTICAL 2D SPOT-SIZE CONVERSION

FIELD OF THE INVENTION

The present invention relates to methods for coupling single-mode fiber arrays to photonic integrated circuits. More specifically, the invention concerns optical assemblies for realizing two-dimensional (2D) spot-size converters (SSCs) between optical mode fields in optical waveguides of different thicknesses and widths.

BACKGROUND OF THE INVENTION

Photonic integrated circuit (PIC) chips typically need optical input and output coupling from and to single-mode fiber (SMF) arrays. However, waveguides in photonic integrated circuits have typically a much smaller mode field or "spot size" compared to a standard single-mode optical fiber (SSMF). The smaller the spot size difference, the larger is the optical coupling loss between the PIC waveguide and the SMF.

Arrays of small-core fibers, lensed fibers or tapered fibers are not good for coupling light from (or to) large waveguide arrays with small spot sizes, because the fiber cores have random variation in their position with respect to each other and it is not possible to align all fibers at the same time to an array of small PIC waveguides. Variation in fiber core position in a fiber array is typically about ±1 µm, due to variations in the core position inside each fiber, and to fiber-to fiber positioning, for example in a V-groove array.

A horizontal and vertical spot-size converter (SSC) is then usually needed between waveguides and optical fibers. Such 2D converter can be one structure that simultaneously changes the spot-size in the horizontal and vertical direction, or a combination of separate vertical and horizontal converter structures, where the waveguide is tapered from one spot size to another separately in each direction.

A separate spot-size converter chip, also called a waveguide interposer, can be used to perform vertical and horizontal spot-size conversion between a standard SMF array and a small-waveguide array at the edge of a PIC chip. The advantage is that there are no waveguide-to-waveguide variations in an array of thin waveguides, and that arrays of thin mode fields can be precisely aligned. 2D spot-size converters have been realized with various methods, such as direct writing of waveguides, step-like etching of a thick waveguide layer, gray-scale lithography, polishing of waveguides, tapering of optical fibers, lenses, grating couplers, sub-wavelength diffractive structures, inverse tapers etc. Horizontal tapering is usually not a problem on PIC's, but vertical spot size conversion is difficult to do with most optical waveguide technologies by using wafer-level processing techniques.

In some applications, there is also the need to couple light between thick and thin waveguides on different PICs or even within one multi-layer PIC, i.e. without any optical fibers being part of this coupling task. Optical fibers and PIC waveguides can both be considered as "waveguides", so the need for 2D SSC can be seen as a general need for spot-size conversions between optical mode fields in optical waveguides of different thicknesses and widths. One of those waveguides (typically the thicker one) can be a SMF or its other end can be coupled to a SMF.

OBJECT OF THE INVENTION

There has not yet been presented a perfect solution for coupling light between an array of thin waveguides and another array of thick waveguides. An ideal coupling concept would need to have wide transmission spectrum, polarization independent operation, low insertion loss and a small size, as well as low manufacturing and assembly cost for the parts.

It is the object of the present invention to find a novel solution to the problem described above, which alleviates the drawbacks of the prior art solutions. The invention is defined in the appended independent claims, and the various embodiments of the invention in the dependent claims.

SUMMARY OF THE INVENTION

According to the invention, the waveguides on two different chips or in two different waveguide layers are coupled together in such a way that the width of the optical mode in one waveguide corresponds to the thickness of the optical mode in the other waveguide, and vice versa. Thus each waveguide mode needs to be enlarged only in the horizontal direction, but the optical mode field expands (or shrinks) both horizontally and vertically. Thus horizontal and vertical spot size conversion between a small and a large optical waveguide is performed by combining two horizontal spot-size conversions and by rotating the mode between the two waveguides around the optical axis. This mode rotation can be achieved with up-reflecting waveguide mirrors, with rotation of the waveguide chips, or their combination.

According to the invention, an optical assembly for realizing horizontal and vertical spot-size conversion to couple light from a thin waveguide to a thick waveguide, or vice versa, is provided. The assembly comprises:

at least one first thin waveguide with a first section having a first optical mode field and a horizontal spot-size expansion section providing spot-size conversion for a first horizontal dimension of said first optical mode field of a light beam propagating in said first waveguide;

at least one second thick waveguide with a second section having a second optical mode field and a horizontal spot-size reduction section providing spot-size conversion for a second horizontal dimension of said second optical mode field of a light beam propagating in said second waveguide.

The expanded end of said first waveguide is aligned and rotated to interface with the reduced end of said second waveguide, so that the mode fields in said first and second waveguides are rotated 90 degrees with respect to each other, whereby the spot size of a light beam so coupled between the first and second waveguides is expanded or shrunk in both transverse dimensions, depending on the direction of the light beam.

According to some embodiments, at least two said first waveguides are placed on a first common planar substrate and at least two said second waveguides are placed on a second common planar substrate. The substrates may be separate and parallel substrates.

In some embodiments, the waveguide layers may be stacked on one common substrate.

According to some embodiments, up-reflecting elements are placed at the expanded ends of said first waveguides and at the reduced ends of said second waveguides to reflect light between the first and second waveguides.

In some embodiments, the first waveguides comprise horizontally bent sections to align the optical axes of all said first waveguides in the optical assembly to a common optical axis, and up-reflecting elements at the interfaces of said first waveguides to reflect light from the plane of said first waveguides and to couple light between each pair of said first and second waveguides. The second waveguides may have their optical axes perpendicular to the plane of said first waveguides.

According to further embodiments, a gap provided between interfacing ends of the first and second waveguides may have a dimension which cause no significant beam divergence in the gap in either of the two transverse directions of a light beam, whereby the mode fields of said first and second waveguides couple to each other directly without any focusing optics between them.

Alternatively, a gap provided between the interfacing ends of said first and second waveguides may have a dimension which causes a significant beam divergence in the gap in the transverse direction to the length of said first waveguide, whereby a diverging light beam is focused or collimated to said second waveguide with a convex lens or by a concave mirror at the interface of said second waveguide.

In some embodiments, the second waveguides comprise horizontally bent sections to align the optical axes of the first and second waveguides in the optical assembly to a common optical axis, whereby light is coupled directly between each pair of said first and second waveguides, without any up-reflecting elements in the coupling interface. The first waveguides may be placed on a substrate with slots adapted to receive said bent sections of said second waveguides in order to align to a common optical axis the optical axes of all said first and second waveguides in optical assembly.

In some further embodiments, the first waveguides are placed on one substrate and the second waveguides are placed on a different substrate, at least one of which said substrates has in at least one direction mechanical alignment features adapted to receive corresponding alignment features or surfaces on the other substrate, when said substrates are pressed together. The mechanical alignment features may be patterned by processing at least partly the same material layers used to form said first and/or second waveguides.

Further embodiments of the invention may include one or several features from the following bulleted list:
- the first, second or both waveguides include a horizontal spot-size expansion waveguide section with a gradually tapered waveguide width;
- the first, second, or both waveguides include a horizontal spot-size expansion section with a slab waveguide region where an input light beam expands and a concave waveguide mirror that collimates or focuses said expanded light beam to another waveguide having a horizontally expanded mode field with respect to said input light beam;
- the first, second or both waveguides include a horizontally bent section with a total internal reflection (TIR) mirror;
- the up-reflecting elements of the first, second or both waveguides include a total internal reflection (TIR) mirror.

In practical applications of some embodiments of an inventive optical assembly the first waveguides are part of a photonic integrated circuit (PIC). A single-mode fiber array (SMF) may be optically coupled to an optical interposer between a PIC and the SMF array, said optical imposer comprising an array of said second waveguides. The light may then be coupled to the optical fiber array from the end facets of the second waveguides.

The various embodiments of the invention are characterized by what is stated in the appended claims.

DETAILED DESCRIPTION OF EMBODIMENTS

Figure 1:
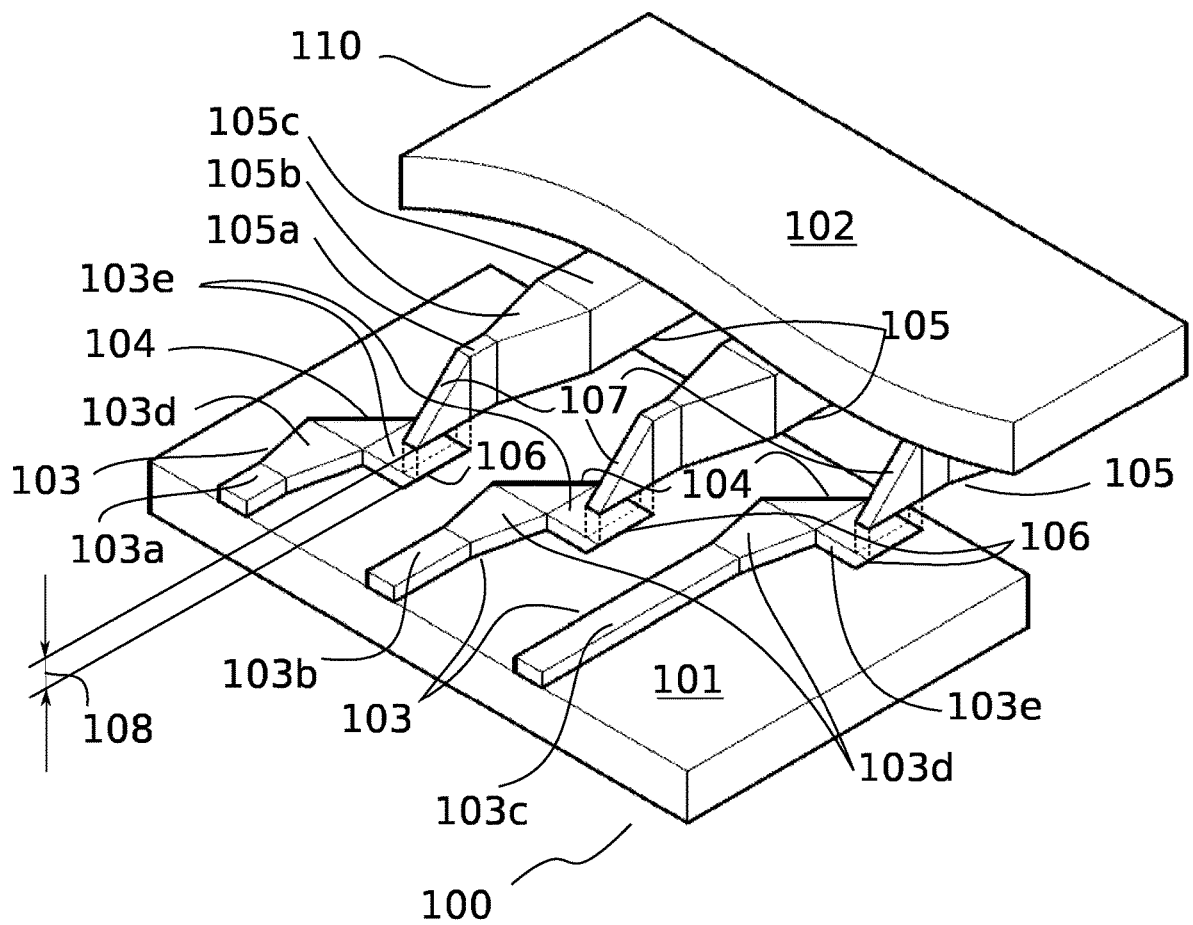
FIG. 1 shows one embodiment of an inventive photonic integrated circuit.

In detail, exemplary embodiments shown in the drawings are based on horizontal tapering of approximately 3×3 µm (3 µm thick and 3 µm wide) first silicon-on-insulator (SOI) waveguides to a size of approximately 3×12 µm, whereby the mode fields of the waveguides are enlarged horizontally. Throughout this description the waveguide dimensions are given as height×width, in that order. The width of the thin waveguides typically varies in the PIC. In 3 µm thick SOI waveguides, the width is typically 3 µm or narrower in at least some parts of the PIC. Reference to 3×3 µm waveguides are thus only made as exemplary input waveguides. The FIGS. 1-4 are not perfectly to scale in this regard, and may show approximately 3×5 µm waveguide dimensions.

Light is then coupled to an input end of 12×3 µm second waveguides having a matching mode field when the two waveguide modes are rotated with respect to each other. The width of the second waveguide is then tapered from 3 to 12 µm to achieve the targeted output size of 12×12 µm. From such a 12×12 µm waveguide, the light may then be coupled to the core of a standard single-mode optical fiber (SMF). Obviously, any combination of differently sized SOI waveguides and other types of optical waveguides may be coupled together by the same inventive principle that allows coupling light from an array of thin waveguide modes to another array of thick waveguide modes without vertical tapering of any of the waveguides.

One embodiment is illustrated in FIG. 1. It shows a photonic integrated circuit (PIC) 100, which includes three 3 µm thick first waveguides 103 on a silicon substrate 101. The functional parts of the PIC are not shown and three waveguides are chosen only for visualizing the invention. FIG. 1 also shows an interposer 110, which includes three 12 µm thick second waveguides 105 on a silicon substrate 102. The buried oxide (BOX) layer is omitted from the figure for clarity. In this embodiment, the thin 103 and thick 105 waveguides are all placed horizontally and in parallel, and the thick 105 waveguides are upside down on top of the thin waveguides 103.

Each thin waveguide 103 consists of narrow, in some embodiments 3×3 µm, input parts 103a, 103b or 103c, here each having a different length, a tapered section 103d, a bent section 104, and a 3×12 µm section 103e. The tapered section 103d is a horizontally broadened taper section that performs a first horizontal spot-size conversion from a narrow input width (e.g. 3 µm) to a final width (e.g. 12 µm). The horizontal tapering of the thin waveguide 103 can be realized in many alternative ways and in different parts of the PIC 100. For example, it can be realized with continuous tapering of the waveguide width, as shown in FIG. 1, or with the combination of a slab waveguide (where light horizontally expands) and a curved waveguide mirror (that collimates the expanded light).

The bent section may consist of a bent waveguide or a horizontal waveguide mirror 104. The relative locations of the tapered and bent sections can also be exchanged or even overlapped. For example, the combination of a slab waveguide and a curved mirror can perform both tapering and bending. In some embodiments of the invention the bent sections may be absent, as the circuit layout, location requirements and other design considerations determine the optimum shape and size of the waveguides in each case. In the particular embodiment of FIG. 1 the bent section can be left out, when the straight sections 103e are not sharing the same optical axis and the waveguides 103 would thus not overlap each other.

After the tapered and bent sections light is guided into the 3×12 μm section 103e, which ends with an up-reflecting mirror 106. Obviously, the mirror would be a down-reflecting mirror if the assembly 100, 110 would be turned upside down.

Similar up-reflecting mirrors 107 are on the interposer chip 110. Between the up-reflecting mirror pairs 106 and 107 light passes vertically in either direction, as shown with the arrow 108. In FIG. 1, the up-reflecting mirrors 107 at the narrow ends 105a of the thick waveguides 105 actually reflect light from these waveguides downwards, as the waveguides 105 are upside down under the silicon substrate 102. The thick waveguides 105 also have horizontally tapered sections 105b and wide (e.g. 12 μm wide) output waveguide sections 105c. The up-reflecting mirrors 106, 107 are preferably TIR (total internal reflection) mirrors, but they can also be metallized mirrors or other similar elements. Here we use the terms "up-reflecting mirrors" and "up-reflecting elements" to refer to any up or down reflecting structures that couple the light from the waveguides either up or down with respect to the horizontal plane where the waveguides are located.

Light is coupled from the thin waveguides 103a, 103b, 103c of the PIC circuit 100 to the output ends 105c of the optical interposer 110 as follows: Light propagates in the waveguide along the direction of the optical axis of each waveguide section. The optical axes are perpendicular to the end surfaces of each entry and exit point of light into respective waveguide portions. When encountering a horizontally bent section or an up-reflecting mirror, like 104, 106 or 107, the optical axis and the light beam make a turn.

In the case shown in FIG. 1, the first parts 103a, 103b, 103c of the three waveguides 103 are in parallel. The waveguide sections 103a, 103b and 103c have in this example different lengths, in order to demonstrate the possibility of relatively free positioning of the waveguides on the substrate 101 in some embodiments of the invention. The light beam from each waveguide section 103a-c then enters a tapered section 103d, which gradually broadens the light beam to a 12 μm wide horizontal configuration.

As the light beams hit the horizontal TIR mirrors 104, their optical axes are turned to become parallel with each other (which was not necessary before the bent sections). At the end of the parallel waveguide sections 103e, the up-reflecting mirrors 106 reflect the light vertically up to the up-reflecting mirrors 107 of the waveguides 105 that are placed orthogonally on top of the up-reflecting mirrors 106 to efficiently collect the light and to reflect it to the narrow ends of the thick waveguides 105. Orthogonal placement of the up-reflecting mirror pairs 106 and 107 means that the polarization of the light is rotated 90° when light couples between the first thin and the second thick waveguides 103, 105. Light then travels horizontally in the upside-down-turned waveguides 105, first through a tall and narrow section 105a that accommodates the horizontally enlarged mode field of the waveguide 103, now turned by the up-reflecting mirrors 106 into a vertical direction. The horizontally tapered section 105b of the waveguide 105 then gradually enlarges the mode field of the light beam in an orthogonal direction with respect to the already enlarged mode field. The result is that the thin and narrow optical mode of the first waveguide 103 (e.g. 3×3 μm) has been efficiently coupled to the thick and wide optical mode of the second waveguide 105 (e.g. 12×12 μm), by a combination of two horizontal mode size expansions and one rotated interface between the two waveguides 103, 105. From the output end facets (not shown) of the 12×12 μm-sized waveguides 105 the light may be coupled to the cores of standard single-mode optical fibers (not shown), for example. The polarization of the light beam is turned, so that the horizontal TE polarization of the light beam entering the waveguide 103 is now vertically oriented TM polarization in the waveguide 105, and vice versa.

As mentioned above, the circuit layout and other design considerations determine the optimum shape and size of the waveguides in each case. In the concept shown in FIG. 1, the up-reflecting mirror pairs can be processed on the chip in various locations that don't have to be along the same line, as shown in FIG. 1. When the optical axes of the optical waveguides 103 merge on the lower chip 100, the optical waveguides on the upper chip 110 may be located side by side in a traditional manner, making the alignment of lower and upper up-reflecting mirrors to each other easier. Especially wet-etched up-reflecting mirrors typically need to be in specific directions, and all mirrors in FIG. 1 are indeed having the same orientation. However, this may in some embodiments not be necessary, as long as each mirror pair 106, 107 is orthogonally aligned, like in FIG. 1.

If the thin and thick waveguides 103, 105 are on two separate chips 100, 110, as illustrated in FIG. 1, the up-reflecting mirrors are preferably placed near the edges of those chips, so that the substrate 102 doesn't overlap too much with the substrate 101. This can be beneficial if there are flip-chip integrated components, wire bonds or other parts extending on top of the substrate 101. The thin and thick waveguides 103, 105 can also be fabricated as a 2-layer PIC on a common substrate 101 or 102 (depending on their relative vertical positioning), for example by using a layer-transfer technique to transfer one waveguide layer on top of the other waveguide layer.

Figure 2:
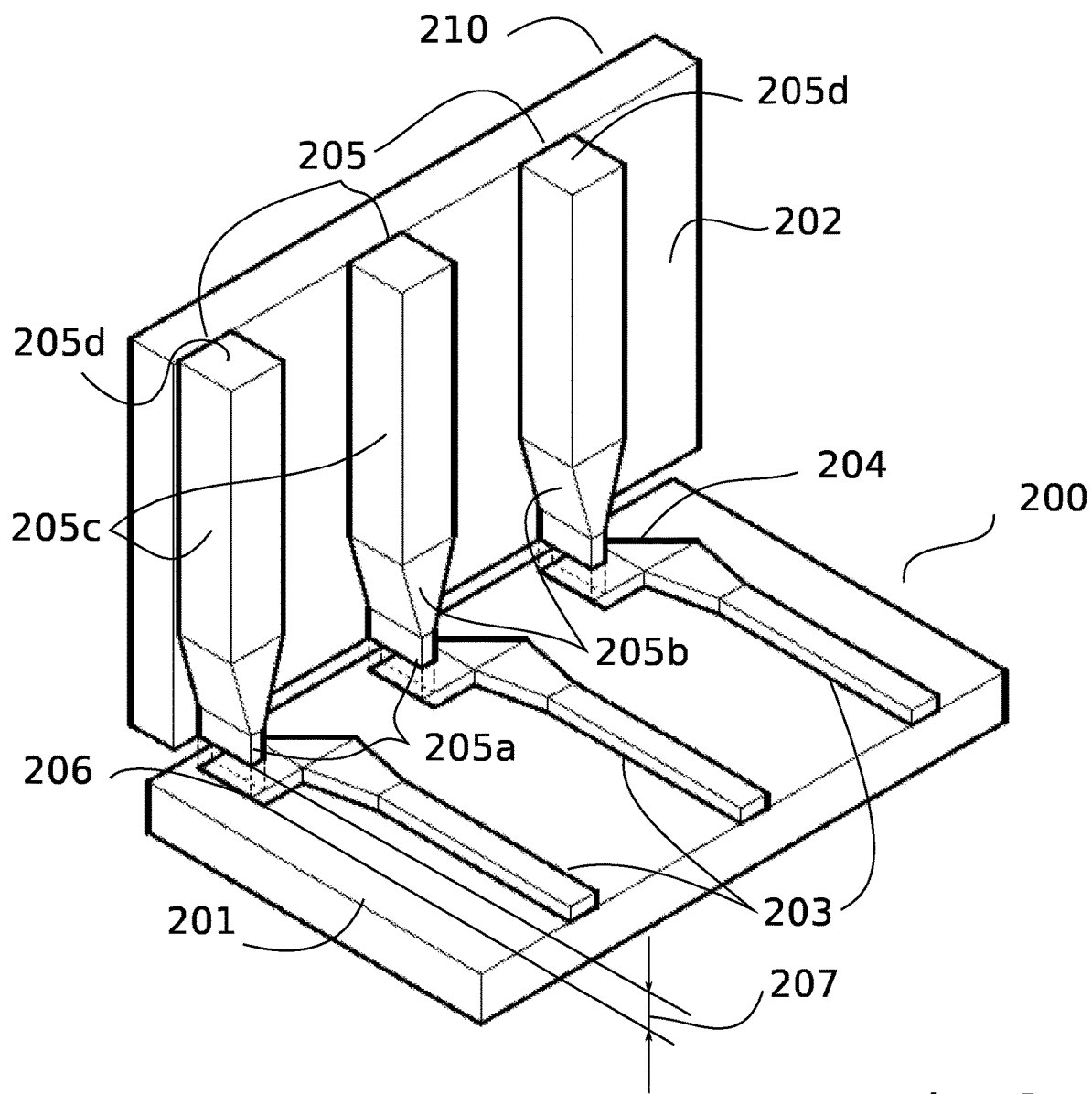
FIG. 2 shows a second embodiment of an inventive photonic integrated circuit.

Another embodiment of the invention is illustrated in FIG. 2. A photonic integrated circuit 200 includes three 3 μm thick first waveguides 203 on a silicon substrate 201. An optical interposer 210 includes three 12 μm thick second waveguides 205 that are on another silicon substrate 202. In this embodiment, the substrate 202 and the second waveguides 205 are placed vertically with respect to the first waveguides 203.

In the embodiment shown in FIG. 2, the travel of light in the first waveguides 203 is similar to what is described in FIG. 1, i.e. the three thin waveguides 203 involve straight, tapered and bent waveguide sections. The tapered sections horizontally expand the mode fields of the narrow (e.g. 3 μm wide) first waveguides 203 to provide a targeted 12 μm width at the output end of each of the first waveguides 203. The bent sections 204 turn the waveguides so that they at that point all share the same optical axis, before the light is coupled to the up-reflecting mirrors 206 at the ends of the 3×12 μm waveguide sections.

Here, light couples from the up-reflecting mirrors 206 up and directly into the bottom end-facets of the 3×12 μm wide portions 205a of the second waveguides 205. Thus, no up-reflecting mirrors in the second waveguides 205 are required for the coupling of light between the waveguides 203 and 205 at the gap 207. The light beams will then travel through the tapered waveguide sections 205b to reach the targeted 12 μm thick and 12 μm wide waveguide dimensions in the straight waveguide sections 205c. From there, the light can be coupled to optical fibers through the waveguide end facets 205d.

The polarization of the light beam is turned also here, so that a horizontal TE polarization of a light beam in the waveguides 203 becomes a vertically oriented TM polarization in the waveguides 205.

In the embodiments like the one in FIG. 2, a 12 μm SOI interposer chip 210 can be placed rather freely on top of a 3 μm SOI PIC 200. Because of its vertical orientation, the chip 210 will cover only a relatively small area of the PIC 200 and its substrate 201.

Figure 3:
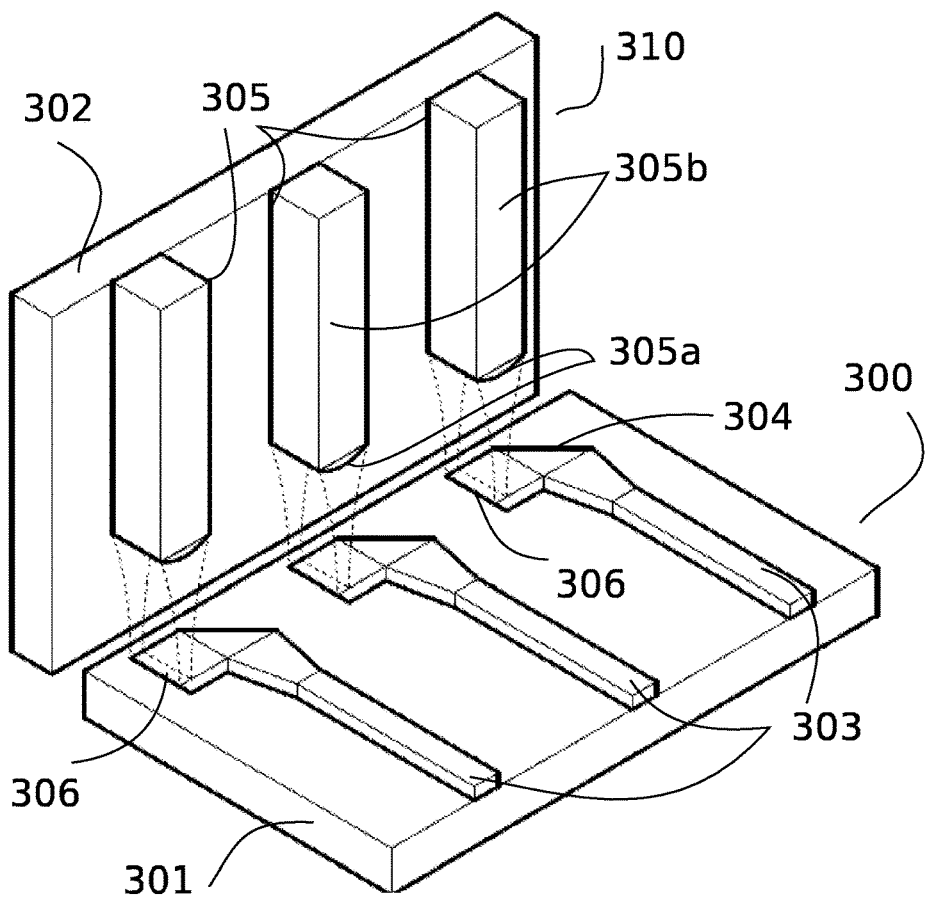
FIG. 3 shows a further embodiment of an inventive photonic integrated circuit.
Figure 4:
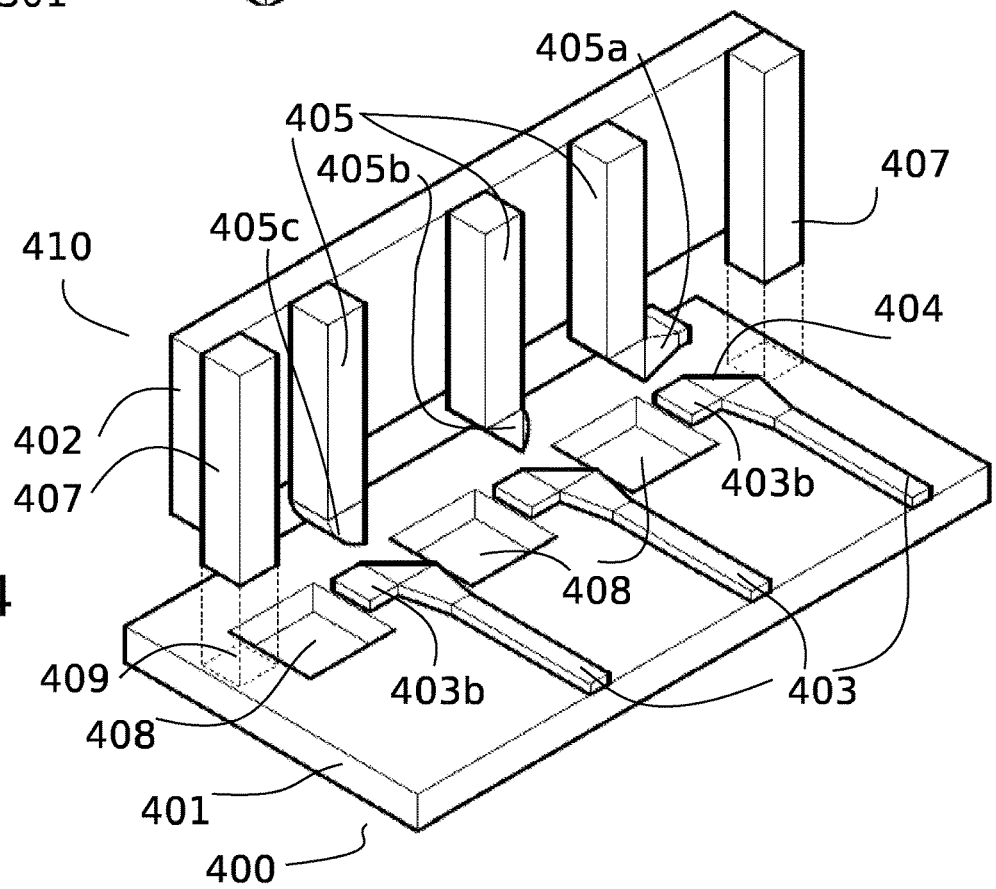
FIG. 4 shows further exemplary embodiments of inventive photonic integrated circuits.

Further embodiments of the invention are illustrated in FIGS. 3 and 4. In FIG. 3, a PIC 300 again includes three 3 μm thick first waveguides 303 with tapered and bent sections and up-reflecting mirrors on a silicon substrate 301, like in FIGS. 1-2. Three 12 μm thick second waveguides 305 are realized on another silicon substrate 302 to form an optical interposer 310 that is placed vertically with respect to the 3 μm thick waveguides 303 and their substrate 301, like in FIG. 2. Each waveguide 305 consists of a 12 μm thick and more than 3 μm (e.g. 12 μm) wide waveguide portion 305b and of a lens 305a directed towards the up-reflecting mirror 306 of the corresponding waveguide 303. The lens can be fabricated as part of the waveguide without any separate processing or lithography step. It is preferably planar in the vertical direction, being aligned with or being part of the waveguide side-walls, and only curved in the horizontal direction. The light beam that is reflected up from the up-reflecting mirror 306 diverges as it propagates in the free-space gap between the up-reflecting mirror 306 and the lens 305a. This divergence is much faster in the direction where the optical mode field from the thin waveguide 303 is narrow, which direction corresponds to the width of the thick waveguide 305. The gap is preferably kept so small that the beam doesn't significantly diverge in the other direction, that corresponds to the thickness of the second waveguide 305 and to the enlarged width of the first waveguide 303. Thus, the beam mainly diverges in one direction only. The lens 305a then collimates the diverged beam and couples it into the waveguide portion 305b.

Again, no mirrors are needed in the second waveguides 305, and the polarization of light is turned also here from a horizontal TE polarization entering the waveguides 303 to a vertically oriented TM polarization in the waveguides 305, or vice versa.

The first main difference of the embodiment shown in FIG. 3 with respect to the ones in FIGS. 1-2 is that there is no need for a tapered section or narrow (e.g. 3 μm wide) waveguide section in the second waveguide 305, because the curved input facet of the thick waveguide 305 acts as a lens and performs horizontal tapering of the light beam in the free-space gap outside the waveguide 305. This provides for making the second waveguides 305 shorter, and they are also easier to fabricate, as the waveguides 305 no longer need to have high aspect ratio (i.e. height vs. width).

The second main difference is that there may be a finite distance between the up-reflecting mirror 306 and the lens 305a. In FIGS. 1-2 the free-space gap needs to be minimized, as it causes unwanted beam divergence. In the embodiment illustrated in FIG. 3, the finite gap is exploited to enlarge the light beam in one direction. Such finite distance is very beneficial in PIC testing, for example, where the interposer chip can be held at a safe distance, e.g. 15-30 μm, above the PIC wafer or chip, avoiding the risk of scratching them against each other. In some embodiments of this kind, the substrate 302 need not extend as far down as in FIG. 3. The finite distance can also be beneficial when making permanent assemblies. In both assembly and testing, the finite distance can help to avoid scratching any optical input/output facets when the two waveguide chips 300, 310 are aligned with respect to each other using passive or active alignment.

In FIG. 4, a PIC 400 includes three 3 μm thick first waveguides 403 on a silicon substrate 401. Three 12 μm thick second waveguides 405 are realized on a silicon substrate 402, and this optical interposer part 410 is placed vertically with respect to the 3 first waveguides 403 and their substrate 401, as in FIGS. 2-3. The substrate 401 is provided with slots 408 which are etched or machined into the substrate 401 and designed to receive the ends of the waveguides 405. For the purpose of a simple illustration of various embodiments of the invention, each waveguide 405 in FIG. 4 has a different light beam coupling device 405a, 405b and 405c. Only one of these coupling device types is preferably chosen to be used in each optical interposer 410. The light beam coupling devices are lowered down to each receiving slot 408 during the assembly (or chip/wafer testing), in order to align the common optical axis of all the straight waveguide portions 403b on the PIC, with the optical axes of all the coupling devices 405a-c, so that all these optical axes merge together. Proper alignment of the interfacing waveguide portions may be provided by studs 407 or a similar mechanical arrangement. The studs 407 may be placed in patterned recesses 409 providing mechanical alignment features, or have some other alignment features, which locks them into place in the place of the substrate 401.

In the embodiment of FIG. 4, there are no up-reflecting mirrors required at the facets or interfaces of the interfacing waveguide portions 403b, but rather the light propagates directly into a coupling device 405a, 405b or 405c. The coupling device 405a comprises an interfacing 3 μm wide and 12 μm thick waveguide portion, a tapered waveguide section, and a TIR mirror, similarly to items 105a, 105b and 104 in FIG. 1. The coupling device 405b has a lens like the lens 305a in FIG. 3 and a TIR mirror. The third exemplary coupling device 405c consists of a curved concave mirror which collects the incoming light beam and reflects it upwards through the waveguide 405. All the coupling devices 405a-c collect the light from the end facet of the 3 μm thick and 12 μm wide first waveguide 403, expand the light beam (spot size) in the direction that corresponds to the thickness of the waveguide section 403b, and turn the light orthogonally upwards with respect to the substrate 401 of the PIC 400. Expanding the light beam and turning the light up occurs horizontally with respect to the surface of the optical interposer 410. In all FIGS. 2-4 the optical interposer only needs one lithographic patterning step that corresponds to the definition of the width of the thick waveguides 205, 305 and 405. In all embodiments, the increase of both the width and the height of the light beam (spot size) is achieved by combining the horizontal enlargement of the light beam with the first 103, 203, 303, 403 and second 105, 205, 305, 405 waveguides without any change in the thickness of the waveguides themselves, or their mode fields.

In the embodiments of FIGS. 1-4, it is necessary to align the chip pairs 100+110, 200+210, 300+310 and 400+410 to each other, in order to ensure light is coupled between waveguides and mirrors as intended with a minimum of losses. This can be done with various different methods that are not at the core of this invention, but briefly discussed here.

The most straightforward method is to use active alignment, where light transmission through the thin and thick waveguides and the coupling interface between them is maximized. A U-loop can sometimes be added to either of the waveguide chips to simultaneously maximize the transmission of two coupling interfaces, for example at the edges of a wide waveguide array, and to have both the input and output coupling through one waveguide chip only. Another common method for coupling two waveguide chips together is to use passive alignment with machine vision and suitable alignment marks.

An attractive method for low-cost mass production is passive mechanical alignment. This can be realized in various different ways. One option is to etch V-shaped alignment grooves on each chip, for example during the fabrication of up-reflecting mirrors, and to add alignment balls or similar protrusions that align the two v-grooves when brought together. It is also possible to realize some kind of monolithic protruding alignment features, such as studs, robs or pyramids, on either one of the chips, which then passively align to V-grooves, inverse pyramid holes or similar features on the other chip. One such arrangement has been discussed in connection with FIG. 4 where a rectangular stud 407 is patterned into the 12 μm thick SOI layer on the optical interposer chip 410 and self-aligned with the 12 μm thick waveguides 405 and their coupling devices 405*a-c*. With a flat end facet, such a stud can be used to precisely control the vertical positioning of the two chips 400 and 410. Passive alignment in all 3 directions is possible by pressing the flat end facet of the stud 407 against a flat surface on the chip 400, while pressing the top (or bottom) and left (or right) surface of a similar (preferably longer) stud against the side-walls of an etched pit that is similar to the slot 408 shown in FIG. 4.

It is also possible, especially for the embodiments in FIGS. 2-4 to wet-etch a V-shaped alignment groove on the 3 μm SOI chip and dry-etch a lithographically patterned V-shaped tip extending out from the edge of the 12 μm SOI layer. The V-shaped tip then falls into a V-groove on the 3 μm SOI chip when the 12 μm SOI chip is placed vertically on top of the 3 μm SOI chip.

Similar mechanical alignment features can be added to the assemblies shown in FIGS. 2-3 where various different alignment features etched into the 12 μm SOI layer can penetrate into various different holes patterned into the PIC chip. In some cases this may require that the alignment features protrude beyond the edge of the substrate (202, 302, 402), as shown in FIG. 4, see items 407. This may be achieved by under-etching the Si substrate or by using a cavity-SOI wafer, for example.

In some applications, it may not be desired that the fibers are placed vertically with respect to the PIC. To avoid this, the thicker waveguides 205, 305, 405 may be bent with horizontal bend sections (similar to 204 in FIG. 2 or 405*a-c* in FIG. 4) to turn them from the vertical to horizontal direction with respect to the PIC 200, 300, 400. If the output facets (like 205*d* in FIG. 2) of those bent waveguides are coupled to a SMF array then that SMF array has each fiber in horizontal direction while the individual fibers in the array are on top of each other. It is also possible to have upreflecting mirrors in the thick waveguides to enable the orthogonal placement of fibers with respect to the substrate of the thick waveguides. This allows adding a horizontal fiber array to the embodiments of FIGS. 2-4, or a vertical fiber array to the embodiment of FIG. 1.

The invention is not intended to be limited to the use of any particular materials or waveguide dimensions. References to silicon, SOI, 3 or 12 μm thick waveguides are only particular embodiments of the invention and should not restrict the scope of the invention. Also, any references to "thin", "thick", "narrow" and "wide" waveguides refer to the relative thicknesses and widths of the optical mode fields in those waveguides rather than the dimensions of the waveguides themselves, as the mode field size also depends on the materials and shapes used in the waveguide: Sometimes the mode field can even expand as the waveguide is made smaller.

References to "perpendicular", "orthogonal" and "parallel" don't refer to exact angles, as the invention may also be applied and/or work as intended with small variations from exact theoretically given angles. For example, the waveguide facets can be somewhat tilted to reduce back-reflections, which leads to refraction of light in those facets. Similarly, the up-reflecting elements can reflect the light up (or down) in a somewhat non-orthogonal direction, which also reduces back-reflections. These small deviations from the nominal angles also allow placement of two waveguide chips into somewhat non-parallel or non-orthogonal orientation with respect to each other. The terms "up", "down", "horizontal" and "vertical" have also been used to explain particular embodiments of the invention and the invention can naturally be applied in other orientations where these directions are reversed or rotated into some other directions. Rotating some of the parts by 180° or reflecting them with respect to some point or plane is also possible within the scope of this invention. Some embodiments of the invention may have been explained with the assumption that light propagates from the thin waveguide to the thick waveguide, but the invention naturally applies also in the reverse case, where any reference to terms like "input" or "output" should be exchanged.

The invention claimed is:

1. An optical assembly for realizing horizontal and vertical spot-size conversion to couple light between an expanded end of a first thin waveguide to one end of a second thick waveguide, said assembly comprising:
at least one first thin waveguide with a first section having a first optical mode field and a horizontal spot-size expansion section providing spot-size conversion for a first horizontal dimension of said first optical mode field of a light beam propagating in said first thin waveguide; and
at least one second thick waveguide with a second section having a second optical mode field and a horizontal spot-size reduction section providing spot-size conversion for a second horizontal dimension of said second optical mode field of a light beam propagating in said second thick waveguide; wherein
the expanded end of said first thin waveguide is aligned and rotated to interface with said one end of said second thick waveguide, so that the polarization of the light beam in said first thin and second thick waveguides is rotated 90 degrees with respect to each other, whereby the spot size of a light beam so coupled between the first thin and second thick waveguides is expanded or shrunk in both transverse dimensions, depending on the direction of the light beam.

2. The optical assembly according to claim 1, wherein at least two said first thin waveguides are placed on a first common planar substrate and at least two said second thick waveguides are placed on a second common planar substrate.

3. The optical assembly according to claim 1, wherein up-reflecting elements are placed at the expanded ends of said first thin waveguides and at said one end of said second thick waveguides to reflect light between the first thin and second thick waveguides.

4. The optical assembly according to claim 2, wherein said first thin and second thick waveguides are placed on two separate parallel substrates.

5. The optical assembly according to claim 2, wherein said first thin and second thick waveguides are placed on two stacked waveguide layers on one common substrate.

6. The optical assembly according to claim 1, wherein said first thin waveguides comprise horizontally bent sections to align the optical axes of all said first thin waveguides in the optical assembly to a common optical axis, and up-reflecting elements at the interfaces of said first thin waveguides to reflect light from the plane of said first thin waveguides and to couple light between each pair of said first thin and second thick waveguides, said second thick waveguides having their optical axes perpendicular to the plane of said first thin waveguides.

7. The optical assembly according to claim 1, wherein a gap provided between the interfacing ends of said first thin and second thick waveguides has a dimension which cause no significant beam divergence in the gap in either of the two transverse directions of the light beam, whereby the mode fields of said first thin and second thick waveguides couple to each other directly without any focusing optics between them.

8. The optical assembly according to claim 1, wherein a gap provided between the interfacing ends of said first thin and second thick waveguides has a dimension which causes significant beam divergence in the gap in a transverse direction corresponding to the width of said second thick waveguide, whereby a diverging light beam is focused or collimated to said second thick waveguide with a convex lens at the interface of said second thick waveguide.

9. The optical assembly according to claim 1, wherein a gap provided between the interfacing ends of said first thin and second thick waveguides has a dimension which causes significant beam divergence in the gap in a transverse direction corresponding to the width of said second thick waveguide, whereby a diverging light beam is focused or collimated to said second thick waveguide with a concave mirror at the interface of said second thick waveguide.

10. The optical assembly according to claim 1, wherein said second thick waveguides comprise horizontally bent sections to align the optical axes of said thin first and second thick waveguides in said optical assembly to a common optical axis, whereby light is coupled directly between each pair of said first thin and second thick waveguides.

11. The optical assembly according to claim 10, wherein said first thin waveguides are placed on a substrate with slots adapted to receive said bent sections of said second thick waveguides in order to align to a common optical axis the optical axes of all said first thin and second thick waveguides in the optical assembly.

12. The optical assembly according to claim 1, wherein said first thin waveguides, said second thick waveguides, or both, include a horizontal spot-size expansion waveguide section or a horizontal spot-size reduction waveguide section, respectively, with a gradually tapered waveguide width.

13. The optical assembly according to claim 1, wherein said first thin waveguides, said second thick waveguides, or both, include a horizontal spot-size expansion section or a horizontal spot-size reduction waveguide section, respectively, with a slab waveguide region where an input light beam expands and a concave waveguide mirror that collimates or focuses said expanded light beam to said second thick or said first thin waveguide, respectively, having a horizontally expanded mode field with respect to said input light beam.

14. The optical assembly according to claim 1, wherein said first thin waveguides, said second thick waveguides, or both, include a horizontally bent section with a total internal reflection (TIR) mirror.

15. The optical assembly according to claim 3, wherein said up-reflecting elements of said first thin waveguides, said second thick waveguides, or both, include a total internal reflection (TIR) mirror.

16. The optical assembly according to claim 1, wherein said first thin waveguides are part of a photonic integrated circuit (PIC).

17. The optical assembly according to claim 1, wherein a single-mode fiber array (SMF) is optically coupled to an optical interposer between a PIC and the SMF array, said optical imposer comprising an array of said second thick waveguides.

18. The optical assembly according to claim 17, wherein light is coupled to said optical fiber array from the end facets of said second thick waveguides.

19. The optical assembly according to claim 1, wherein said first thin waveguides are placed on one substrate and said second thick waveguides are placed on a different substrate, at least one of which said substrates has in at least one direction mechanical alignment features adapted to receive corresponding alignment features or surfaces on the other substrate, when said substrates are pressed together.

20. The optical assembly according to claim 19, wherein said mechanical alignment features are patterned by processing at least partly the same material layers used to form said first thin and/or second thick waveguides.

* * * * *